(12) United States Patent
Allport

(10) Patent No.: US 6,480,578 B1
(45) Date of Patent: *Nov. 12, 2002

(54) COMMUNITY EMERGENCY TELEPHONE NOTIFICATION SYSTEM

(76) Inventor: Douglas C. Allport, 46-8740 Maple Grove Cres., Burnaby, BC (CA), V5A 4G5

(*) Notice: Subject to any disclaimer, the term of this patent is extended or adjusted under 35 U.S.C. 154(b) by 0 days.

This patent is subject to a terminal disclaimer.

(21) Appl. No.: 09/401,862

(22) Filed: Sep. 22, 1999

Related U.S. Application Data

(62) Division of application No. 08/670,687, filed on Jun. 26, 1996, now Pat. No. 6,021,177.
(60) Provisional application No. 60/000,649, filed on Jun. 29, 1995.

(51) Int. Cl.[7] ............................................. H04M 11/04
(52) U.S. Cl. ............................. 379/48; 379/49; 379/42
(58) Field of Search .............................. 379/37, 39, 40, 379/41, 42, 46, 47, 48, 49; 455/404, 521; 340/502, 531, 539

(56) References Cited

U.S. PATENT DOCUMENTS 3,937,889 A    2/1976  Bell, III et al.

(List continued on next page.)

FOREIGN PATENT DOCUMENTS

| DE | 27 17 137 A1 | 4/1977 | | |
|---|---|---|---|---|
| DE | 41 31 488 A1 | 9/1991 | | |
| GB | 2 225 194 A | 11/1989 | | |
| JP | 56-38690 | 4/1981 | | |
| JP | 59-83445 | 5/1984 | | |
| JP | 62-219200 | 9/1987 | | |
| JP | 63-76642 | 4/1988 | | |
| JP | 1-251113 | 10/1989 | | |
| JP | 2-77920 | 3/1990 | | |
| JP | 2-135599 | 5/1990 | | |
| JP | 3-38122 | 2/1991 | | |
| JP | 3-220700 | 9/1991 | | |
| JP | 403255775 | * 11/1991 | ............ | H04N/1/32 |
| JP | 4-175968 | 6/1992 | | |
| JP | 6-46018 | 2/1994 | | |
| JP | 6-204910 | 7/1994 | | |
| JP | 7-7540 | 1/1995 | | |

OTHER PUBLICATIONS

Hutchinson, "High–rise Warning System Uses Telephone Lines", Canadian Electronics Engineering, vol. 19, No. 3, p. 39, Mar. 1975, Toronto, CA.

Patent Abstracts of Japan, vol. 008, No. 194 (E–264), Sep. 6, 1984.

Patent Abstracts of Japan, vol. 18, No. 467 (E–1599) Aug. 30, 1994.

Bellcore GR–CORE, LSSGR: Voiceband Data Transmission Interface Section 6.6, Issue 1, Dec. 1994.

*Primary Examiner*—Melur Ramakrishnaiah
(74) *Attorney, Agent, or Firm*—Finnegan, Henderson, Farabow, Garrett & Dunner, LLP

(57) ABSTRACT

A telecommunications system and device for providing a notification or warning of pending or imminent danger to the public. The system provides the communication of a desired warning signal and the geographic coverage for such signal, the subsequent data search and issuing of such signals, and a preprogrammed, AC/DC powered alarm/notification device which is coupled to individual telephone lines within homes and businesses. The alarm/notification device constantly monitors the telephone line for specific codes, and upon receipt of such codes, is activated to provide visual and/or audio alert notification.

1 Claim, 13 Drawing Sheets

U.S. PATENT DOCUMENTS

| | | | |
|---|---|---|---|
| 4,346,263 A | * | 8/1982 | Elkins .................. 379/102.02 |
| 4,361,730 A | | 11/1982 | Barber et al. |
| 4,518,822 A | | 5/1985 | Martinez |
| 4,551,581 A | | 11/1985 | Doughty |
| 4,582,956 A | | 4/1986 | Doughty |
| 4,641,127 A | * | 2/1987 | Hogan et al. ................. 379/40 |
| 4,651,339 A | | 3/1987 | Gibbs |
| 4,741,022 A | | 4/1988 | Chebra et al. |
| 4,868,859 A | | 9/1989 | Sheffer |
| 4,872,194 A | | 10/1989 | Trell |
| 5,029,290 A | | 7/1991 | Parsons et al. |
| 5,131,019 A | | 7/1992 | Sheffer et al. |
| 5,134,644 A | | 7/1992 | Garton et al. |
| 5,185,779 A | | 2/1993 | Dop et al. |
| 5,278,539 A | | 1/1994 | Lauterbach et al. |
| 5,394,461 A | | 2/1995 | Garland |
| 5,448,618 A | | 9/1995 | Sandlerman |
| 5,510,907 A | * | 4/1996 | Koichi ....................... 379/40 |
| 5,579,443 A | | 11/1996 | Tatematsu et al. |
| 5,621,379 A | | 4/1997 | Collins |
| 5,628,050 A | | 5/1997 | McGraw et al. |
| 5,696,487 A | | 12/1997 | Choi |

* cited by examiner

COMMUNITY EMERGENCY TELEPHONE NOTIFICATION SYSTEM

This application is a division of Ser. No. 08/670,687, filed Jun. 26, 1996, now U.S. Pat. No. 6,021,177 and is based on and claims priority from United States Provisional Application No. 60/000,649, filed Jun. 29, 1995, titled "Community Emergency Telephone Notification System," to Douglas C. Allport, the contents of which are hereby fully incorporated herein by reference.

FIELD OF THE INVENTION

This invention relates to a notification device method and system, and more particularly to such a device, method and system capable of providing emergency notification using a standard telephone system.

BACKGROUND OF THE INVENTION

In all but a few communities throughout North America, community officials rely on door-to-door notification when they have to alert people of emergency situations that demand their immediate attention and action. Generally, however, door-to-door notification is ineffective for a number of reasons. First, it requires a large allocation of human resources in order to reach the many hundreds of thousands of people that may be affected by an emergency situation. Further, the time to recruit and organize the human resources, the danger it may put those human resources in, and the growing distrust of people to strangers that approach their homes, especially at night, all combine to make door-to-door notification ineffective. Numerous news stories of people dying in their sleep from tornadoes, floods, etc., unaware that a dangerous situation existed, provide evidence of how ineffective prior emergency notification systems are and point up the need for an effective community emergency notification system.

In approximately three hundred North American communities, officials presently use a service based on a computerized phone system that calls and delivers a pre-recorded message to all numbers identified to the system provider for notification. The system provider, having secured a contract with a community or private company, has the community or private company provide them with a list of published telephone numbers and a geographic cross reference such as a postal code, or zip-code, so that the list may be narrowed to a specific geographic section of the community.

However, there are a number of problems with such a system. For example, the calls are placed from one or two U.S. locations with all calls having to pass through a local telephone switch. During an emergency, the local switch can be expected to be overloaded already, thereby limiting the probability of a notification call getting through. Additionally, the computerized phone system will send the emergency message as soon as the receiving telephone goes off-hook. Where a peripheral device, such as a common answering machine, is connected to the receiving telephone, the message may be delivered and completed in many instances prior to the answering machine entering into a record mode. In other words, the emergency message may be delivered while the answering machine greeting is being played. Moreover, even if the emergency message is fully recorded on an answering machine, there is no immediate notification of the seriousness of the emergency situation to persons returning to their homes or businesses.

Additionally, in such a system, since the database used by the computerized phone system does not include unlisted numbers, it is incomplete. Also, because of the large number of listing changes that occur daily, the database is typically out of date within a day of being issued and will not include any new listings. Therefore, not all people in an affected area will be notified of an emergency.

Further in using such a computerized phone system, when all the numbers provided have been called, a list of numbers not reached is provided to the municipal authorities for the purpose of door-to-door notification. This list of numbers will include all numbers deactivated since the database was issued, thereby wasting valuable resources sent to reach the people at the registered addresses, and possibly putting these people at risk.

Moreover, in such a system, the capacity of the system is limited by the number of telephone lines available for emergency message notification and by the duration of the emergency message. With a very large geographic area to be notified, or in the event of more than one emergency at a time, the service may not be able to provide the timely delivery of messages needed in response to the emergency situation, such as in the case of a tornado, which offers little time for a warning. Furthermore, in the event of such a rapidly occurring emergency such as a gas leak which is followed by a gas explosion and multi-building fire, becoming an evacuation order, by the time the last messages are being sent, the message may be obsolete and may itself pose a danger.

In such a computerized phone system, the costs include long distance telephone calls made during the emergency. Considering that an emergency may require a number of calls, the annual costs of the system are unpredictable and may exceed budgetary constraints.

Further, the best prior system is only able to provide a delivery rate of about 6,000 calls per hour.

In the case of Canada, the Canadian Government abandoned an attempt to provide emergency notification to all people within a designated area at all times of the day or night in the 1980's because no economical or thorough means to do so could be found. A 1993 provincial and municipal survey suggests that the ability to reach people in the night is a top priority for an emergency broadcast system. However, with no practical means of doing so, the Canadian Government is now implementing a national broadcast system that does not include this ability. Additionally, the problem of effective community, or geographically specific, emergency notification appears to be a problem common to all NATO countries.

Sirens, the preferred method of war-time warnings, continue to be used in some communities. However, because of the high cost of maintenance and the large number of sirens required to reach growing urban populations, sirens are being used less often. Further, the public has become accustomed to sirens and often ignores them.

SUMMARY OF THE INVENTION

This invention provides nations, states, provinces, communities, and private companies wishing to provide an emergency notification service, a thorough, timely and cost effective means to notify people within a specific geographic region of potentially dangerous and life threatening situations.

This invention also provides an emergency notification system in which all telephone users in a specific, selected geographic are can be quickly notified of an emergency situation.

In anther aspect, this invention provides governments and other agencies wishing to provide an notification service, a thorough, timely and cost effective means to notify people within a specific geographic region of various situations.

This invention also provides an notification system in which all telephone users in a specific, selected geographic are can be quickly notified of an specific situation.

This invention also provides an alarm/notification device connectable to a telephone line for receiving notification signals from a notification system.

Further, this invention provides an emergency notification system in which an intermediate device, such as a telephone answering machine, connected to a telephone line does not interfere with delivery of an emergency notification to an alarm/notification device.

The present invention relates to a community emergency telephone notification system, device and a method for providing emergency notification to a specific geographic area.

The emergency notification system, device and method according to the present invention provide governments and private institutions with the means of alerting people in homes and/or businesses within a specific geographic region of a dangerous, or potentially dangerous situation. Such dangerous situations may include, for example, a hurricane, a tornado, an escaped convict, flood, fire, earthquake, and nuclear or chemical release.

In a preferred embodiment of the present invention, the emergency notification system alerts people within a specific geographic region of an emergency situation that demands their immediate attention and action. The system of the present invention issues generic broadcast signals along telephone lines in homes and businesses in specific geographic areas. An alarm/notification device receives the signals and is thereby activated to sound an alarm and/or turn on a light, similar to a common household smoke detector. The device may also display a textual message. The emergency notification system is designed to complement national, state, provincial, regional, and community emergency broadcast systems that currently do not have the capability of reaching persons not listening to a radio or watching television at the time of the emergency. The system is designed to be managed by municipal emergency personnel, and to be supported by the local telephone company.

An object of this invention is to turn people's attention to live media such as radio or TV better suited to following changing conditions. Accordingly, in some aspects, this invention includes advising subscribers of where to obtain more information.

This invention provides users of the emergency broadcast system with a means to test the system by dialing a predefined number which results in the service provider issuing a test or "All Clear" signal specifically and exclusively to the number from which the request was made. This service is used to ensure that a device, the telephone line it is connected to and the system are operational.

This invention provides emergency service personnel with a means to issue a test signal for practice purposes. This test signal is substantially different from a real alarm signal, reducing the number of alarmed citizens (as is typical with other systems).

Additional objectives, features, and advantages of the invention will be set forth in the description which follows, and in part will be apparent from the description, or may be learned by practice of the invention. The objectives and other advantages of the invention will be realized and attained by means of the instrumentalities and combinations particularly pointed out in the written description and appended claims hereof, as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred implementations of the invention and, together with the general description and summary given above and the detailed description of the preferred embodiments given below, serve to explain the principles of the invention.

The above and other objects and advantages of the invention will be apparent upon consideration of the following detailed description, taken in conjunction with the accompanying drawings, in which the reference characters refer to like parts throughout and in which.

DETAILED DESCRIPTION OF THE PRESENTLY PREFERRED EXEMPLARY EMBODIMENTS

Figure 1:
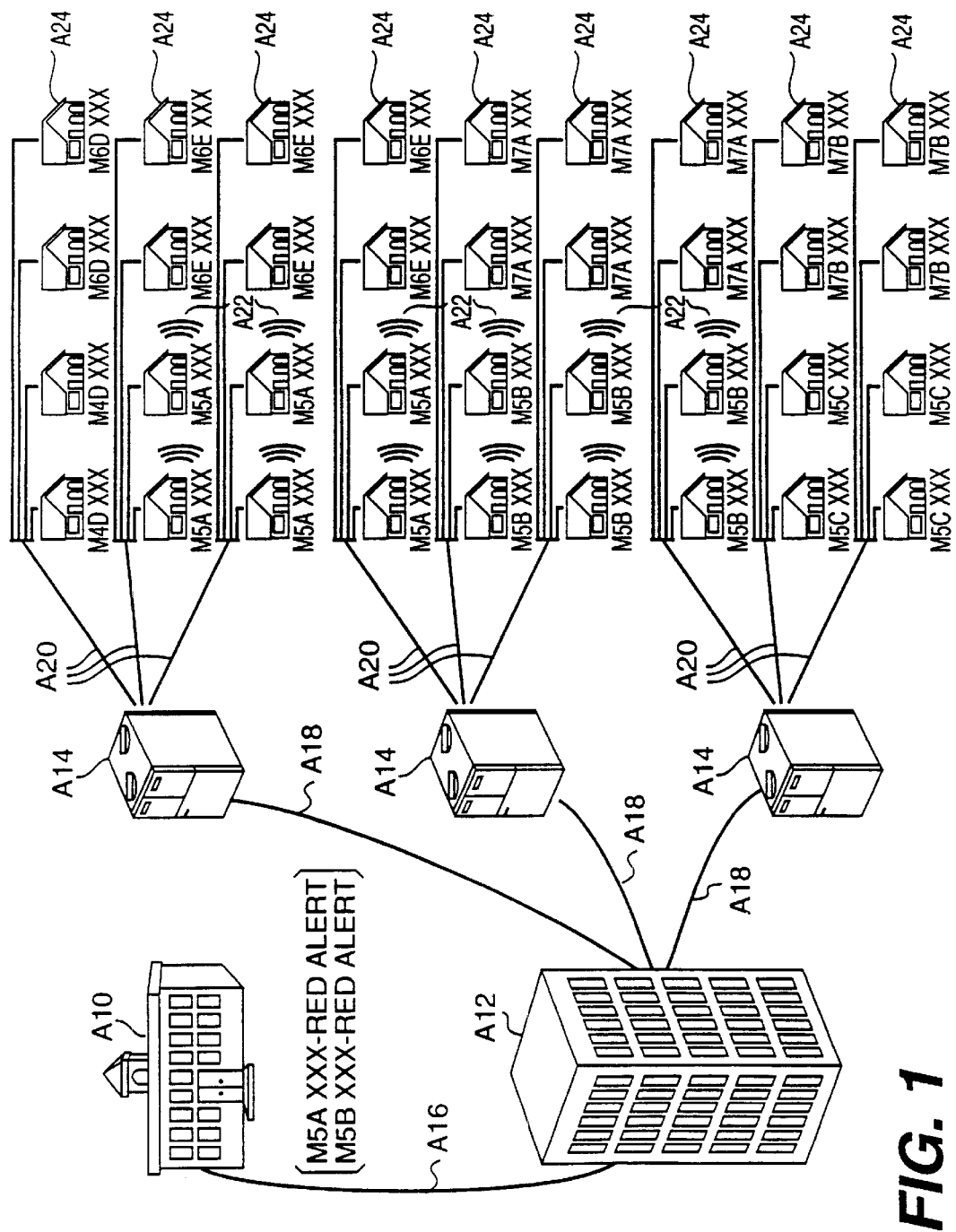
FIG. 1 depicts an emergency notification system according to the present invention.

FIG. 1 is a schematic diagram providing an overview of an emergency telephone notification system according to the present invention. As shown in FIG. 1, a municipal or other government office A10 is connected to a central office A12 of a telephone company via a link A16. The central office A12 is connected to local switches A14 via trunk lines A18. Each local switch is in turn connected to a number of customers or subscribers (homes and businesses A22 and A24). The central office A12 houses the main computer where the telephone company's customer database is kept.

When it is necessary to notify certain customers of a particular situation, e.g., an emergency at or near their locations, the municipal office A10 communicates the postal/zip codes of the geographic regions to be notified (in this case "M5A XXX" and "M5B XXX") as well as the nature of the warning (here "RED ALERT") along link A16 to the central office A12. In many municipalities or regions, link A16 is the private and secured direct link between the "911" office located in the municipal building A10 and the telephone company's central office A12. In some systems, the link is insecure but traffic via the link will be secured by encryption or some other means. Further, the link A16, trunks A18 and local lines A20 can be any form of communication links between the various offices, subscribers and local switches, including but not limited to cables, wires, fiber optic connections, radio connections, microwave connections and the like.

Having received the communication from the municipality A10, the central office A12 then determines what telephone numbers to send messages to. For example, the central office determines which telephone numbers are in the region specified in the notification message. The central office A12 then sends those numbers (and the associated warning) along trunks A18 to the local switches A14 and on through local telephone lines A20 to subscribers A22 and A24. In this example, subscribers denoted A22 fall within the specific postal/zip codes identified for an emergency signals to be sent to (i.e., "M5Axxx" and "M5B XXX"), and A24 denotes subscribers not falling within this defining parameter.

Figure 2:
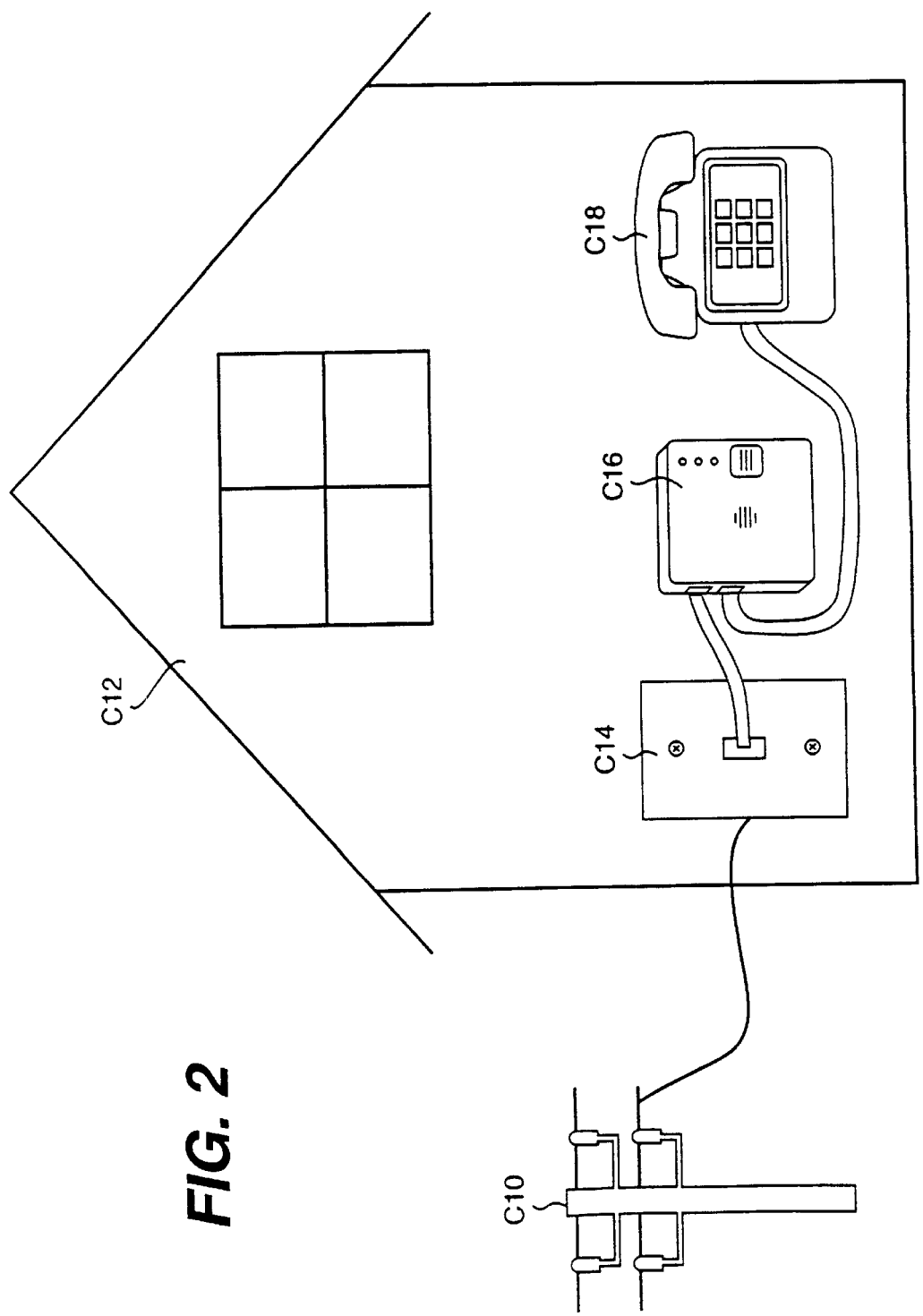
FIG. 2 shows the positioning in a home of an alarm/notification device according to the present invention.

Each subscriber A22–A24 has a alarm/notification device (described in detail below) connected to their telephone line. FIG. 2 is a schematic diagram indicating the preferred positioning of the alarm/notification device at a subscriber's location (home or business). As shown in FIG. 2, the incoming telephone line C10 is connected to the subscriber C12 via a wall outlet jack C14. The alarm/notification device C16 is preferably positioned between the wall outlet C16 and a telephone C18 or other telephony device. Note that no telephone or other telephony device need be connected to the telephone line C10 in order for the alarm/notification device C16 to operate.

Figure 3:
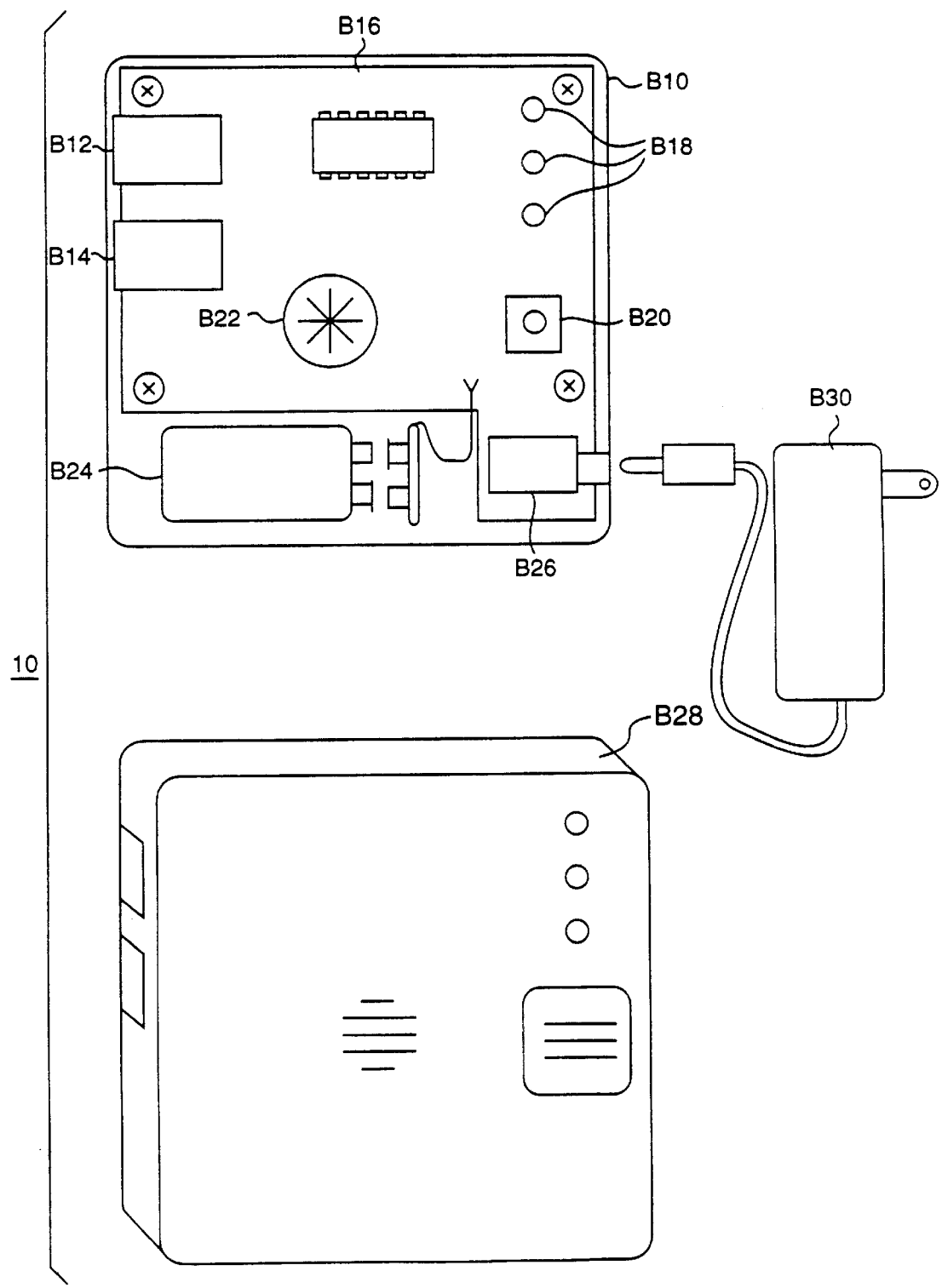
FIGS. 3 and 4 depict embodiments of alarm/notification devices according to the present invention.
Figure 4:
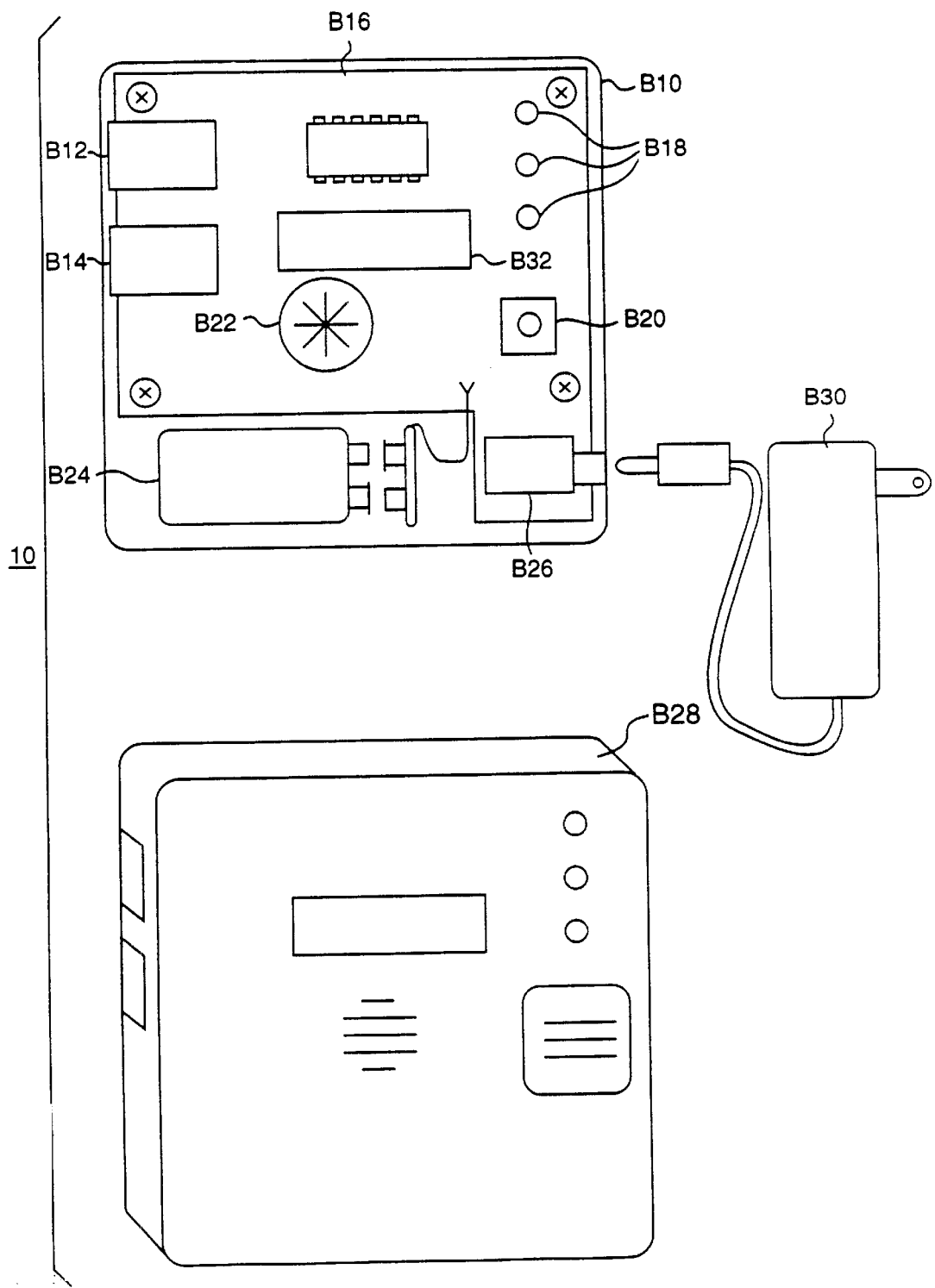

As shown in FIGS. 3 and 4, which are block diagrams of alarm/notification devices according to the present invention, the alarm/notification device C16 (reference numeral 10 in those figures) includes standard in and out telephone jacks, B12 and B14 thereby allowing for a telephone or other telephony device to be used at the same jack as the alarm/notification device C16. The alarm/notification device C16 is preferably located before and not after any peripheral telephony device that might interrupt or interfere with the receipt of incoming signals. In the case of a business where access to the telephone line prior to switch equipment may be limited to a concealed room where no one would hear an audible alarm, a remote alarm, and the means to communicate with that alarm, is preferably provided to operate on the alarm/notification device C16.

As shown in FIGS. 3 and 4 alarm/notification device 10 includes a molded plastic case B10, preferably with screw mounting slots or some other means of connecting the device to a wall or other surface. The alarm/notification device also includes an input telephone jack B12 and an output telephone jack B14.

A printed circuit board B16 preferably includes three LEDs B18 (one red, one green and one yellow). There is also preferably a test/buzzer-off button B20 and an alarm buzzer B22. An external power adapter B30 is also preferably provided. The alarm/notification device 10 also includes a molded plastic cover B28, which preferably includes slots and holes for the LEDs B18 to show through, and for the alarm buzzer B22 to sound through.

The embodiment of the device shown in FIG. 4 also has a display B32 such as a liquid crystal display (LCD) or the like. The cover B28 of this LCD device has hole or window therein to enable viewing the LCD.

As shown in FIGS. 3 and 4, in preferred embodiments of the present invention, the alarm/notification device 10 is a stand alone, AC/DC powered, preprogrammed device located on or adjacent to individual telephone lines in homes and businesses. The device 10 monitors the telephone line, listening for specific signals sent from the telephone company.

When the specific signals are received by the alarm/notification device 10, the device responds with a visual and/or audible notification using the LEDs 318, alarm buzzer B22 and LCD B32 (where applicable). The notification is similar to that found in a common smoke or carbon monoxide detector. When an "all clear" signal is received, the alarm/notification device 10 preferably issues an audible beep from the buzzer B22 and flashes the green LED B18. When the code for a "warning" signal is received, the alarm/notification device 10 preferably sounds the buzzer B22 intermittently and flashes the yellow LED B18. When the code for an "emergency" signal is received, the alarm/notification device 10 preferably sounds the buzzer B22 continuously and flashes the red LED B18.

For the embodiment shown in FIG. 4, in addition to the above actions for the various signals, the LCD B32 displays appropriate text for the various warnings.

Figure 5:
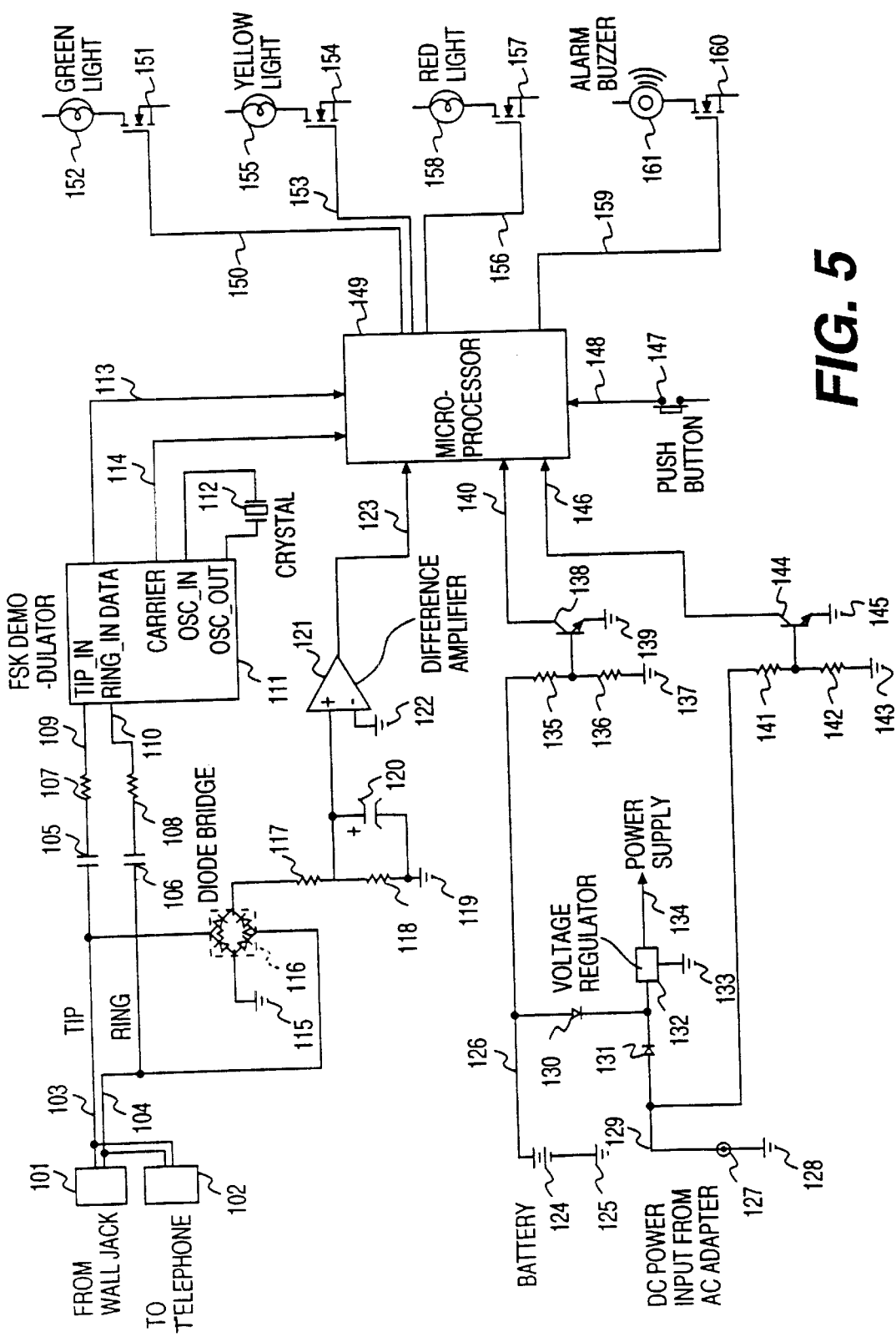
FIG. 5 is a circuit diagram of an embodiment of an alarm/notification device according to the present invention.

FIG. 5 is a block diagram of an alarm/notification device 10 (C16 in FIG. 2) according to the present invention. Alarm/notification device 10 is connected to a telephone line (and thereby to a central office A12) via a connector 101 (B12 in FIGS. 3 and 4), which is preferably an RJ11 connector. A second connector 102 (B14 in FIGS. 3 and 4) is provided to allow a parallel connection to any standard telephone, or any other customer premises equipment commonly connected to a central office. The TIP conductor 103 and the RING conductor 104 are the pair of wires carrying the telephone signals from the central office A12.

The signals on lines 103 and 104 are input to a demodulator 111, such as an frequency shift keyed (FSK) demodulator. Capacitors 105 and 106 and resistors 107 and 108 are used to filter the signals on lines 103 and 104 before they are input to the demodulator 111. The demodulator 111 continuously senses the filtered signals on lines 109 and 110 looking for a modulated FSK signal. The demodulator 111uses a crystal oscillator 112 to obtain a stable frequency reference for demodulating the FSK signal. When an FSK signal is detected, the demodulator 111 outputs a logic low level signal on the CARRIER output conductor 114 to microprocessor 149 (B16 in FIGS. 3 and 4). After detecting the FSK signal, the demodulator 111 demodulates the signal into a serial bit stream, which is output to the microprocessor 149 on the DATA conductor 113.

The TIP and RING signals on lines 103 and 104, respectively, are passed through a diode bridge 116 that rectifies such signals into a single signal that has a positive polarity with respect to the circuit ground 115. The diode bridge 116 output is attenuated by resistors 117 and 118 and low-pass filtered by capacitor 120 before it is sensed by difference amplifier 121. The amplifier 121 compares the attenuated and filtered diode bridge 116 output to a ground reference input 122. If the diode bridge 116 output is at zero volts with respect to ground reference input 122, then the output conductor 123 is set to a logic low level. A logic low level on conductor 123 indicates that the lines 103 and 104 are inoperative and that the alarm/notification device 10 is either disconnected from the central office, or that there is a malfunction in the telephone lines. When the alarm/notification device 10 is connected to the telephone lines through connector 101 and the central office is operating normally, output conductor 123 is at a logic high level.

An AC adapter 127 (B26 in FIGS. 3 and 4) is preferably used as the primary power source for the alarm/notification device 10. The AC adapter 127 supplies a DC current on conductor 129. A battery 124 (B24 in FIGS. 3 and 4) is a secondary power source which preferably can supply power when the AC adapter 127 is not functioning. The battery 124 supplies a DC current through conductor 126. Diodes 130 and 131 ensure that current can flow from only one of the two power sources 127 and 124 into the voltage regulator 132. Current flows from whichever power source 124 or 127 is at a higher DC voltage potential. Therefore, for proper operation, the output voltage rating of the AC adapter 127 will preferably be higher than that of the battery 124 so that the AC adapter 127 supplies the operating current for the alarm/notification device 10 during normal operation. The voltage regulator 132 converts the voltage outputs from the AC adapter 127 or the battery 124 to a fixed stable supply voltage across line 134, which is used as the power supply voltage for the rest of the alarm/notification device 10.

Resistors 135 and 136 attenuate the battery 124 voltage across line 126. Transistor 138 senses the attenuated battery 124 voltage and outputs a logic low level on conductor 126 when the voltage across battery 124 drops below a predetermined level. This level is determined as the voltage at which the battery 124 has become weak and requires replacement. Therefore, the output signal on conductor 140 is used as a low battery input to the microprocessor 149.

Resistors 141 and 142 attenuate the AC adapter 127 voltage across line 129. Transistor 144 senses the attenuated AC adapter 127 voltage and outputs a logic low level on conductor 146 when the AC adapter 127 voltage drops below a predetermined level. This level is determined as the output voltage at which the AC adapter 127 is no longer operative. Therefore, the output-signal on conductor 146 is used by the microprocessor 149 as an indication that the AC power source has failed.

A push button 147 (B20 in FIGS. 3 and 4) is connected to the microprocessor 149 by conductor 148. Push button 147 is preferably a normally-open switch that outputs a logic level low signal on conductor 148 whenever the button is pressed. The microprocessor 149 senses the push button input from conductor 148. The push button 147, also known as the test/buzzer off button, provides the person receiving a warning or alarm signal with a means of turning the alarm buzzer 161 off and with a means of testing the alarm/notification device 10 to see if the alarm buzzer 161 and LEDs 152, 155, and 158 (B18 in FIGS. 3 and 4) (and LCD when appropriate) are working properly. In the case of an emergency signal having been sent, although the user can preferably disable the alarm buzzer 161, the appropriate LED continues to flash until a new signal code has been sent to it, at which time the alarm/notification device 10 is reset and responds as programmed to the new signal code.

Additionally, a user can preferably test the alarm/notification device 10 by telephoning a specific number whereby a test signal is sent to validate that the alarm/notification device 10 is operational. When this test signal is received, if the alarm/notification device 10 is operating properly, the alarm buzzer 161 sounds and the LEDs 152, 155, and 158 flash appropriately. The telephone company may wish to provide each user with a free check call per month and then charge for all other calls in that month. This will prevent abuse of such a system. The alarm/notification device 10 also preferably can self-diagnose itself by sounding the alarm buzzer 161 and flashing the green LED 152 should a problem be found with its circuitry or power supply.

The microprocessor 149 can be any of many well-known and commercially available integrated circuits and is preferably comprised of at least a central processing unit (CPU), and program memory and data memory, which allow it to execute the program instructions as described in greater detail below. The microprocessor 149 preferably has at least six input ports that allow it to sense the signals from conductors 113, 114, 123, 140, 146, and 148. Microprocessor 149 also preferably has at least four output ports that allow it to control the LEDs 152, 155, 158 and the alarm buzzer 161 (and, where appropriate, LCD B32).

By outputting a logic level high on conductor 150, the microprocessor 149 turns on transistor 151 that then supplies power to, for example, the green LED 152. A logic high output on conductor 153 turns on transistor 154 and then supplies power to the yellow LED 155. A logic high output on conductor 156 turns on transistor 157 which then supplies power to the red LED 158. A logic high output on conductor 159 turns on transistor 160 which then supplies power to the alarm buzzer 161.

Note that the signal input to connector 101 is passed unaltered to the second connector 102 and thereby unaltered to other devices connected to the telephone line.

The operation of the alarm/notification device 10 of the present invention is now described with reference to the flowcharts in FIGS. 6–11. The microprocessor 149 is programmed to perform these operations in an manner appropriate for the model and type of microprocessor 149. The appropriate programs can be stored in the program memory of the microprocessor.

Figure 6:
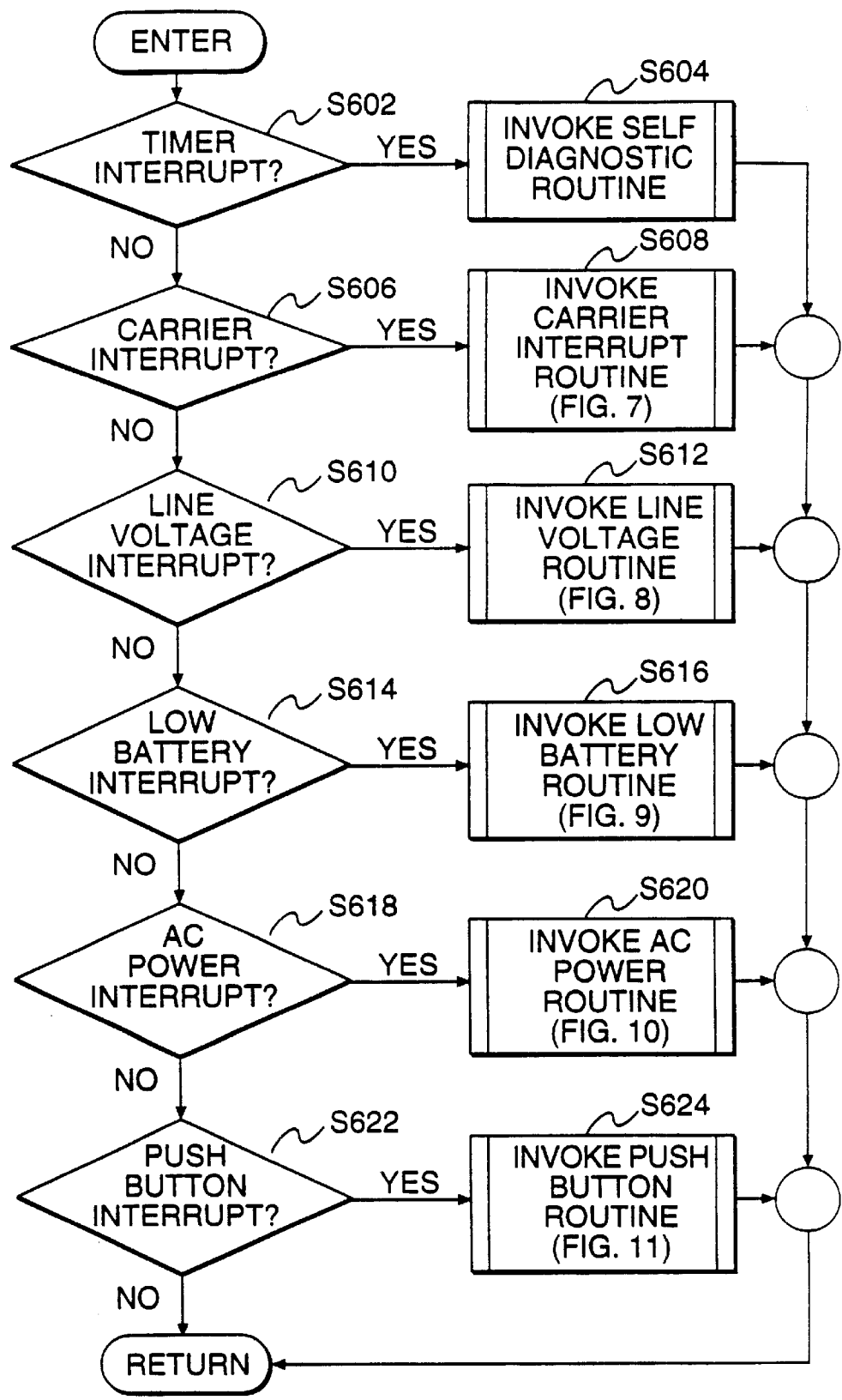
FIGS. 6–13 are flowcharts depicting various operations and functions of embodiments of this invention.

FIG. 6 is a flowchart of the interrupt input routines of the alarm/notification device 10, shown in FIG. 5. The microprocessor 149 is programmed to monitor for and deal with various interrupts, including timer interrupts, carrier interrupts, line voltage interrupts, low battery interrupts, AC power interrupts and push button interrupts. The interrupt processor continuously checks for each kind of interrupt while the device 10 is in operation.

The microprocessor 149 is programmed to perform a self-diagnosis at some regular predetermined interval, e.g., daily. Using a timer built into microprocessor 149, a timer interrupt (step S602) signals the microprocessor 149 to perform self diagnostics (step S604) at the appropriate time since the previous self-diagnosis. The microprocessor 149 performs this diagnosis in an manner appropriate for the model and type of microprocessor.

Microprocessor 149 is programmed to detect and deal with carrier interrupts (which are potentially alarm/notification signals). If a carrier interrupt signal is detected (step S606), the carrier interrupt routine is invoked (step S608). The carrier interrupt routine is described in more detail below with reference to FIG. 7).

Microprocessor 149 is programmed to detect and deal with line voltage interrupts. If a carrier interrupt signal is detected (step S610), the line voltage interrupt routine is invoked (step S612). The line voltage interrupt routine is described in more detail below with reference to FIG. 8).

Microprocessor 149 is programmed to detect and deal with low battery interrupts. If a low battery interrupt signal is detected (step S614), the low battery interrupt routine is invoked (step S616). The low battery interrupt routine is described in more detail below with reference to FIG. 9).

Microprocessor 149 is programmed to detect and deal with AC power interrupts. If an AC power interrupt signal is detected (step S618), the AC power interrupt routine is invoked (step S620). The AC power interrupt routine is described in more detail below with reference to FIG. 10).

Microprocessor 149 is programmed to detect and deal with push button interrupts. If a push button interrupt signal is detected (step S622), the push button interrupt routine is invoked (step S624). The push button interrupt routine is described in more detail below with reference to FIG. 11).

Figure 7:
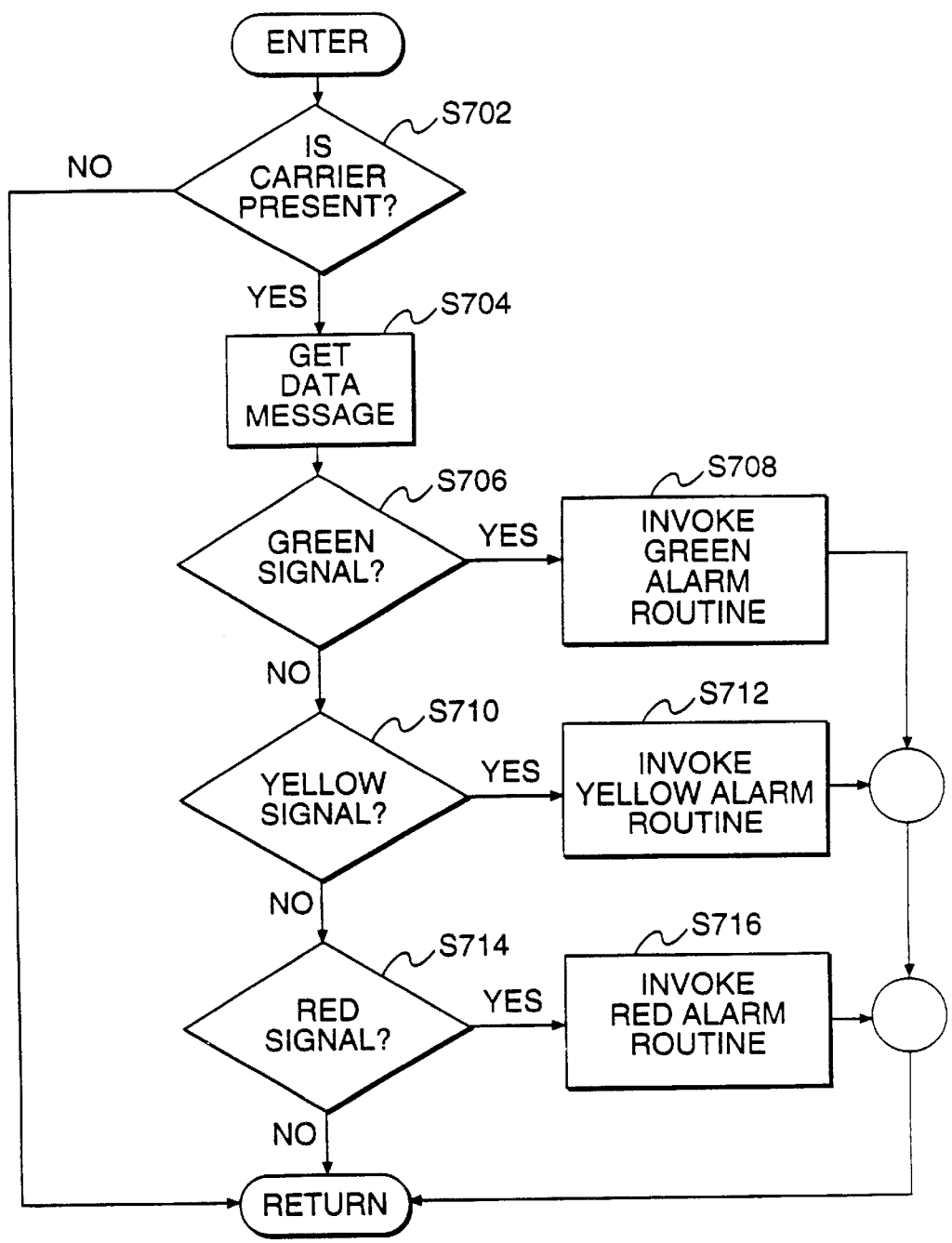

The carrier interrupt routine (step S608 in FIG. 6) is described with reference to the flowchart of FIG. 7. This routine is invoked to process notification signals sent on the telephone line. When a carrier interrupt is detected (step S606), the carrier interrupt routine determines whether or not a carrier is present (step S702). If a carrier is detected by the microprocessor 149 (step S702), the routine obtains a data message (step S704). Note that the carrier signal comes off line 114, and the data message comes off line 113 (in FIG. 5).

The data message is examined to determine what kind of signal it represents. When a "green" or "all clear" signal is received (step S706), microprocessor 149 invokes a green alarm routine (step S708). In the green alarm routine, the microprocessor 149 preferably outputs a signal on line 150 to flash the green LED 152 at regular intervals (e.g., once every fifteen minutes) and a signal on to line 159 to sound the alarm buzzer 161 for a short period, e.g., for half a second.

When a "yellow" or "warning" signal is received (step S710), microprocessor 149 invokes a yellow alarm routing (step S712). In the yellow alarm routine, the microprocessor 149 preferably outputs a signal on line 153 to flash the yellow LED 155 and a signal on line 159 to sound the alarm buzzer. In the yellow alarm routine, alarm buzzer 161 may be sounded for one half second once every five seconds, and the yellow LED 155 may be flashed once every second.

When a "red" or "emergency" signal is received (step S714), microprocessor 149 invokes a red alarm routine (step S716). In the red alarm routine, the microprocessor 149 preferably outputs a signal on line 156 to flash or light the red LED 158 and a signal on line 159 to sound the alarm buzzer 161. In the red alarm routine, the alarm buzzer 161 may sound the continuously and the red LED 158 may be flashed once every second.

Note that there can be multiple "green", "yellow" and "red" signals, representing different kinds of warnings. The various alarm routines are programmed to deal with the different signals. For example, for different "green" signals, the green LED 152 may be flashed at different intervals or with different patterns and the alarm buzzer 161 may or may not be turned on.

Figure 8:
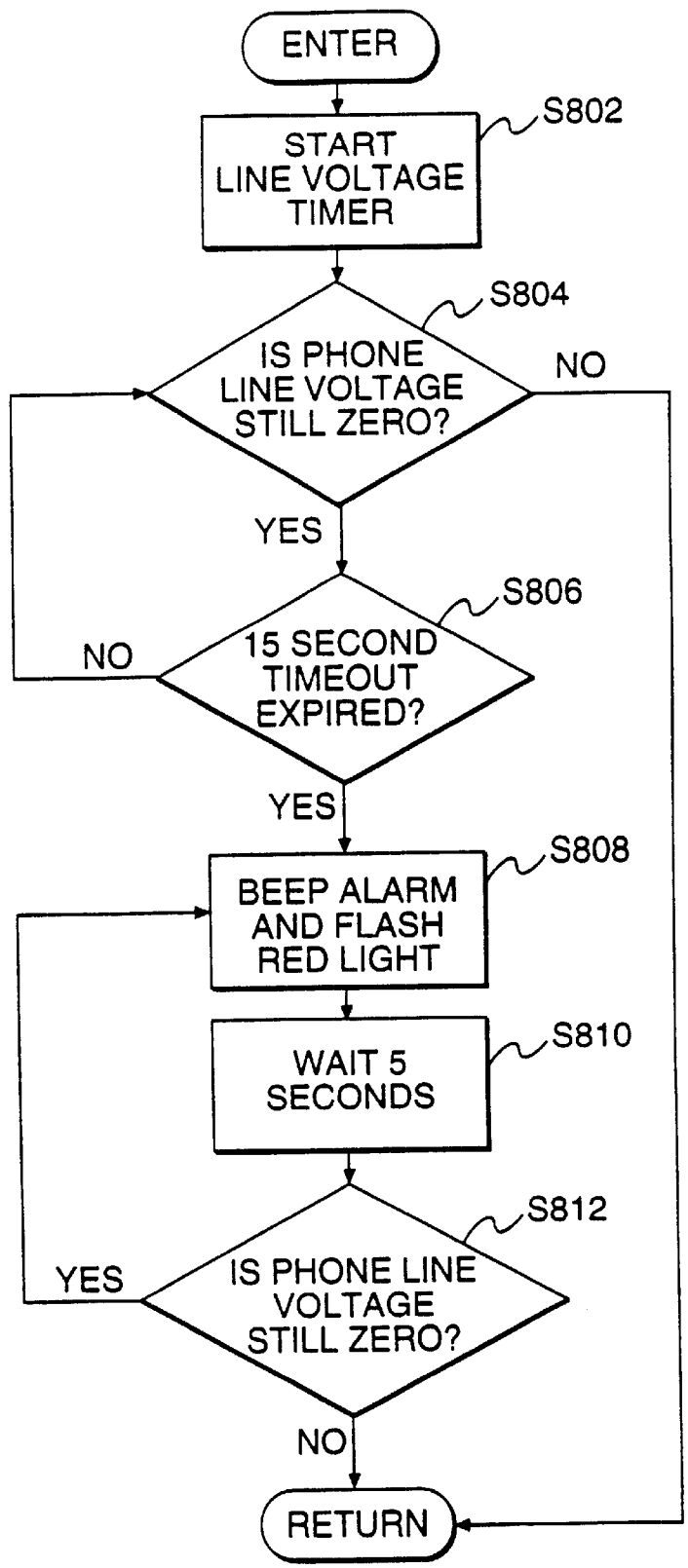

The flowchart in FIG. 8 depicts the processing steps performed by the line voltage routine (step S612). This routine is invoked by the interrupt handling routine when no power is detected across lines 103 and 104. First, a line voltage timer is started (step S802) and it is determined if the phone line voltage is still zero (step S804) for the duration of the timeout period (fifteen seconds in a preferred embodiment). If the phone line voltage becomes non-zero within the timeout period (step S804), the line voltage routine ends its processing. Otherwise, if the line voltage remained zero for the timeout period (step S806), the alarm/notification device 10 flashes the red LED 158 and sounds the alarm buzzer 161 e.g., once every 5 seconds to indicate the loss of line voltage (step S808). After waiting a short time, for example, five seconds (step S810), the line voltage is again monitored to determine if it is still zero (step S812). If the voltage is still zero, the red LED 158 and the buzzer 161 will continue to operate (step S808). This process (steps S808, S810, S812) repeats until power is restored to the telephone line. Once power is restored to the telephone line, the alarm/notification device 10 returns to its previous mode.

Figure 9:
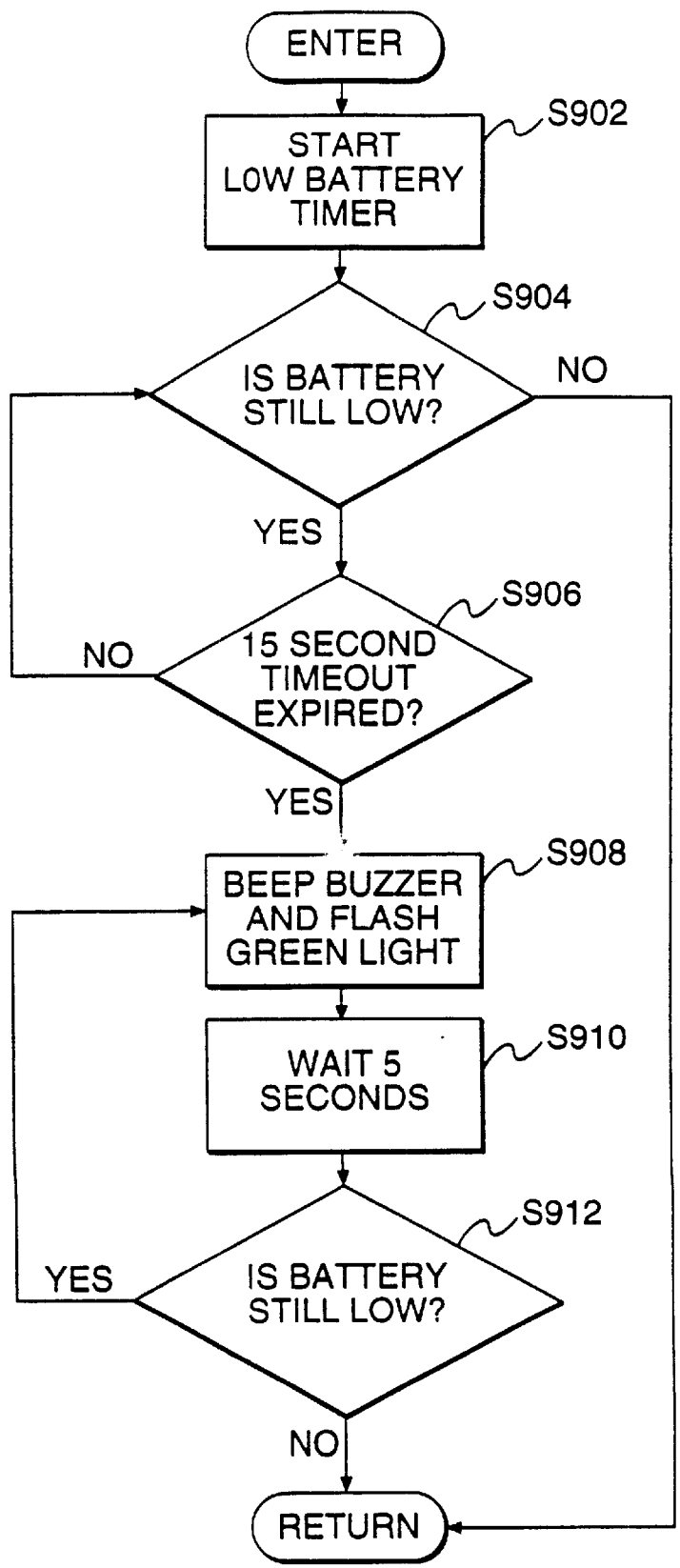

The flowchart in FIG. 9 depicts the processing steps performed by the low battery routine (step S616). This routine is invoked by the interrupt handling routine when low power of battery 124 is detected. First, a low battery timer is started (step S902) and it is determined if the battery power is still low (step S904) for the duration of the timeout period (fifteen seconds in a preferred embodiment). If the battery voltage becomes non-low within the timeout period (step S906), the line voltage routine ends its processing. Otherwise, if the battery power remains low for the timeout period (step S906), the alarm/notification device 10 flashes the green LED 152 and sounds the alarm buzzer 161 e.g., once every 5 seconds to indicate the low battery power (step S908). After waiting a short time, for example, five seconds (step S910), the battery power is again monitored to determine if it is still low (step S912). If the battery power is still low, the green LED 152 and the buzzer 161 will continue to operate (step S908). This process (steps S908, S910, S912) repeats until the battery power is no longer low (e.g., the battery is replaced). Once the battery power is restored, the alarm/notification device 10 returns to its previous mode.

Figure 10:
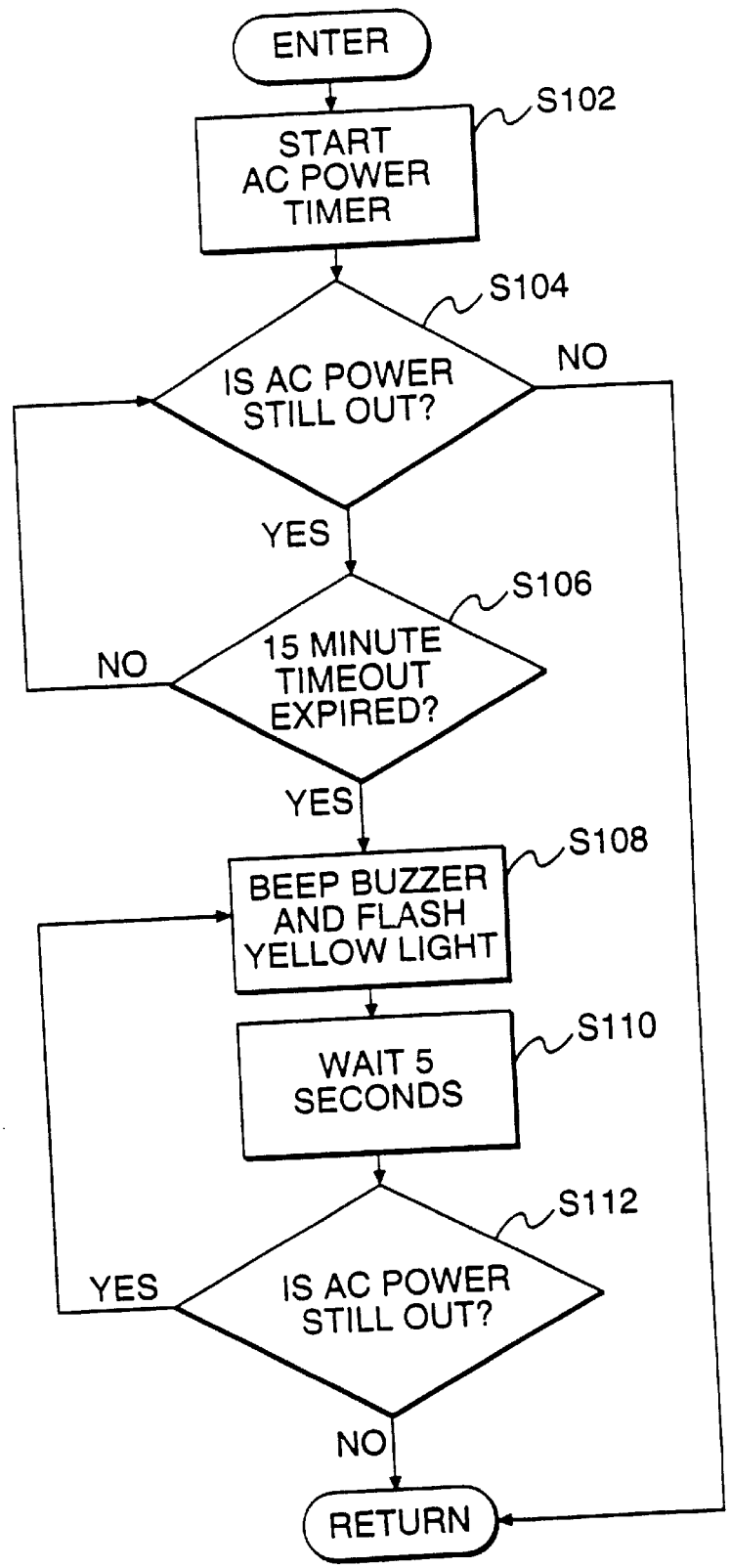

The flowchart in FIG. 10 depicts the processing steps performed by the AC power routine (step S620). This routine is invoked by the interrupt handling routine when an AC power interrupt is detected. First, an AC power timer is started (step S102) and it is determined if the AC power is out (step S104) for the duration of the timeout period (fifteen minutes in a preferred embodiment). If the AC power is restored within the timeout period (step S106), the AC power routine ends its processing. Otherwise, if the AC power remains out for the timeout period (step S106), the alarm/notification device 10 flashes the yellow LED 155 and sounds the alarm buzzer 161 e.g., once every 5 seconds to indicate the AC power being out (step S108). After waiting a short time, for example, five seconds (step S110), the AC power is again monitored to determine if it is still out (step S112). If the AC power is still out, the yellow LED 155 and the buzzer 161 will continue to operate (step S108). This process (steps S108, S110, S112) repeats until the AC power is restored. Once the AC power is restored, the alarm/notification device 10 returns to its previous mode.

Figure 11:
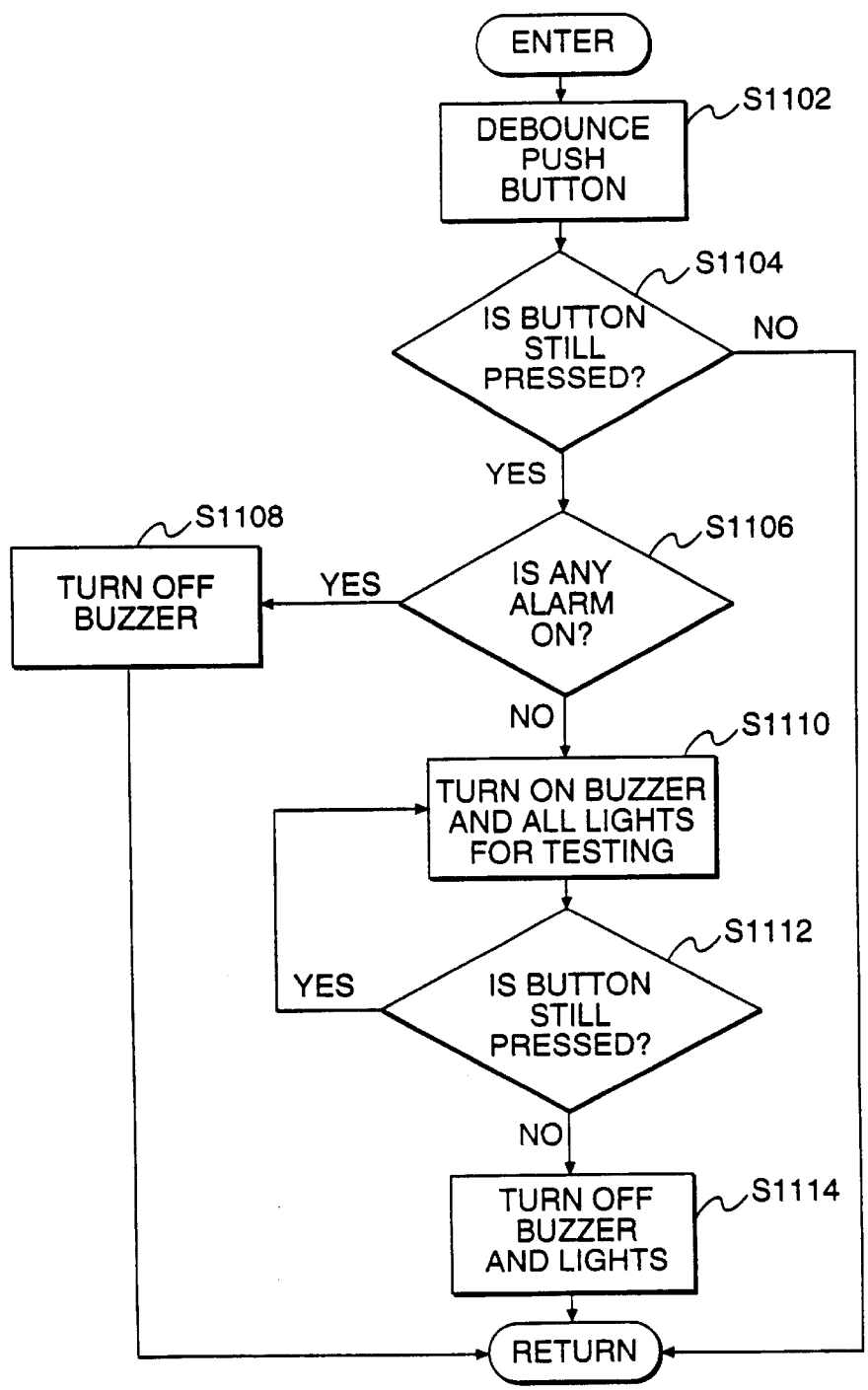

The push button 147 is used for various subscriber operations, some of which depend upon the current state of the alarm/notification device 10. When the button 147 is pushed, the interrupt routine invokes the push button routine (step S624). The flowchart in FIG. 11 depicts the processing steps performed by the push button routine (step S624).

First, the button is debounced (step S1102). This prevents a single button signal from being interpreted by the microprocessor 149 as multiple signals. Then it is determined if the button is still being pressed (step S1104). If the button is not still being pressed (step S1104), the push button routine is ended, otherwise processing continues. If the button is still being pressed (step S1104), then the push button routine determines whether or not any alarm is on (step S1106). If an alarm is on, the buzzer is turned off (step S1108) and processing ends. On the other hand, if no alarm is on (step S1106), the buzzer 161 and all the LEDs 152, 155 and 158 are turned on for testing (step S1110). The buzzer and LEDs are kept on while the button remains pressed (steps S1110, S1112). When the button is no longer pressed (step S1112), the buzzer 161 and LEDs 152, 155 and 158 are turned off (step S1114).

The following table summarizes preferred actions of the various interrupt handling routines with respect to the alarm buzzer 161 and the three LEDs 152, 155, and 158.

| Signal | LEDs | Alarm Buzzer |
| --- | --- | --- |
| Carrier interrupt | depends on signal | depends on signal |
| Line voltage interrupt | flash red | every 5 secs |
| Low battery interrupt | flash green | every 5 secs |
| A/C power interrupt | flash yellow | every 5 secs |
| Push button interrupt | if alarm not on then test all | if alarm on then stop, else test |
| Green alarm signal | flash green once every 15 mins | ½ sec. |
| Yellow alarm signal | flash yellow once per sec. | ½ sec. every 5 secs. |
| Red alarm signal | flash red once per sec. | continuous |

As noted above, in some preferred embodiments, as shown in FIG. 4, the device has a display (LCD) capable of displaying textual information. This display can be used instead of or in conjunction with the LEDs 152, 155 and 158 and the alarm buzzer 161. In these embodiments, the microprocessor 149 stores therein textual information corresponding to each of a number of warning signals and interrupts. This information can be stored in a standard lookup table in a manner well known in the art. An example of this is shown in the following table. In addition to the above operations of the LEDs and the alarm buzzer, microprocessor 149 is programmed to select the appropriate text, depending on the signal received.

| Signal | Text to be displayed |
| --- | --- |
| Carrier interrupt | Carrier interrupted |
| Line voltage interrupt | Line voltage interrupted |
| Low battery interrupt | Battery LOW |
| A/C power interrupt | A/C power interrupted |
| Push button interrupt | (depends on alarm status) TEST or RESET |
| Green alarm signal | ALL CLEAR |
| Yellow alarm #1 | STORM WATCH |
| Red alarm #1 | STORM WARNING |
| Yellow alarm #2 | TORNADO ALERT |
| Red alarm #2 | TORNADO WARNING |
| Red alarm #3 | FLOOD WARNING |
| Reset signal | ALARM RESET |

The text of the messages can be modified for different languages, different meanings of the warnings and the like.

In some embodiments, the alarm/notification device 10 has a speaker and has prerecorded or synthesized digital or analog sound messages stored therein (similar to the manner in which the text is stored above). When an alarm/notification is processed, the microprocessor 149, in addition to operating the LEDs, preferably plays back the sound messages instead of (or alternating with) the alarm buzzer.

In order to deal with different languages, cultures, types of emergencies etc., the alarm/notification device 10 can have a replaceable information card from which it gets its textual and sound information. For instance, in one part of the country a red #2 warning might be a tornado warning, whereas in another part of the country it might be a flood warning. Rather than replace the entire device when a subscriber relocates geographically, the information card is replaced based on the region, the subscriber's language and other local and personal factors. Further, this card will list all radio and TV stations that participate in the local emergency broadcast system, as well as specific telephone numbers to call to test the system or to reach prerecorded messages about the system. These messages can be delivered in a variety of languages.

In some embodiments of the present invention, the alarm/notification device 10 may also have the ability to dial another telephone, e.g., an emergency telephone number (such as "911"), to power on/off a radio or some other device, to connect to a larger light for the hearing impaired, and to record and convey messages such as to paging devices. The ability to call other numbers and devices enables a subscriber to notify another party in the case of an emergency. This feature is useful in the case of subscribers (e.g., handicapped or infirm or with young children) who may need assistance in the case of an emergency. The alarm/notification device may also be able to communicate back to the telephone company that it has received and responded to an emergency code. Alternative embodiments of the alarm/notification device 10 may have remote alarm capabilities to accommodate business use and to accommodate the needs of communicating with municipal emergency personnel.

The operation of an emergency notification system according to the present invention (using alarm/notification device 10) is now described with reference to the flowcharts in FIGS. 12 and 13.

There are three main roles within this system. First (with reference again to FIG. 1), the office A10 must provide information and instructions to the telephone company's central office A12, then the central office must provide information and instructions to the local switches A14, and then the local switches A14 must provide the notification messages to the appropriate subscribers A22. There may be a way of returning a signal received from the device to the switch and from the switch back to the "911" office.

The process of the office A10 providing information and instructions to the telephone company's central office A12 is described with reference to FIG. 12. Having determined the nature and location of an emergency (or a potential emergency), an authorized party (e.g., a town manager, a fire marshall, a town mayor, a regional municipality 911 manager etc.) at office A10 inputs the postal (ZIP) or address codes corresponding to the geographic location and a signal type corresponding to the nature of the emergency (step S120). For example, as shown in FIG. 1, the postal codes "M5B XXX" and "M5B XXX" both have signal types "RED ALERT". Additionally, the regions identified by the system manager (in step S120) are preferably identified by postal/zip code. However, preprogrammed region identification codes that include a number of postal codes may also be used. For example, all the zip codes surrounding a nuclear power plant can be preprogrammed into a region identification code. When used for the purpose of notifying specific individuals, such as all medical and emergency personnel in the area, the present invention may provide a preprogrammed list of telephone numbers collected and maintained by a system management group. Thus, the first piece of information requested for input is the post/zip codes, or a defined region code, for a message to be sent, with the corresponding signal sent to each of the postal/zip codes, regions, or designated individuals.

In a preferred embodiment of the present invention, there are three types of signals that can be sent, namely "all clear,"

"warning," and "emergency". In a preferred embodiment of the present invention, the codes for the three signal types will be standard to a large region such as all of North America, thereby providing a manufacturer of the alarm/notification device 10 with the ability to mass produce a standard product and for the owner of such a device to be able to transfer it from one region to another. If a number of codes are required throughout North America or Europe, the alarm/notification device 10 can be configured to adapt easily to the various regional codes that will be used.

The authorized party must also input some form of authorization (step S122) in order for processing to continue. The method of authorization depends on the system's intended scope and use, and may include passwords, electronic or mechanical keys, magnetic cards or tokens or any other form of identification verification.

According to preferred embodiments of the present invention, the authorized party communicates to the telephone company's switch equipment, those regions to be sent a coded signal, and the specific signal type to be sent to each region. Accordingly, if the authorization is determined to be valid (step S124), then the postal codes and signal type are sent to the telephone switches (step S126).

Figure 12:
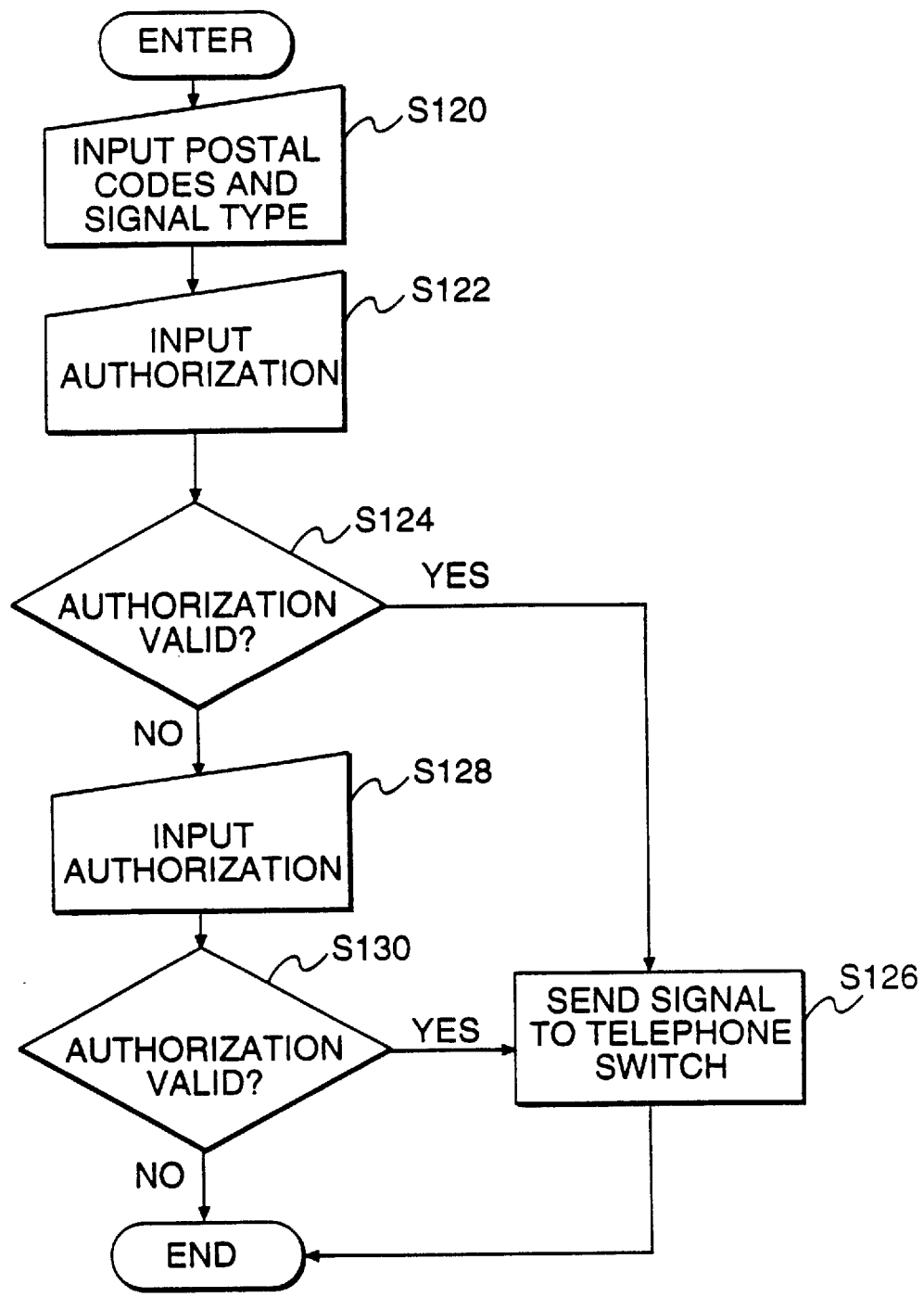

In the embodiment described in FIG. 12, an invalid authorization can be entered once. Therefore, if the authorization is determined to be invalid (step S124), another opportunity is provided to give a valid authorization (steps S128, S130), otherwise the process terminates.

In addition to being able to deliver signal type and region information, the system manager can also preferably receive data from the telephone company. Such communications would preferably include notification that the instructions have been received and been completed. This information is preferably communicated to the telephone company switch equipment along secure and private telecommunications links already in place where 911 emergency systems currently exist.

Figure 13:
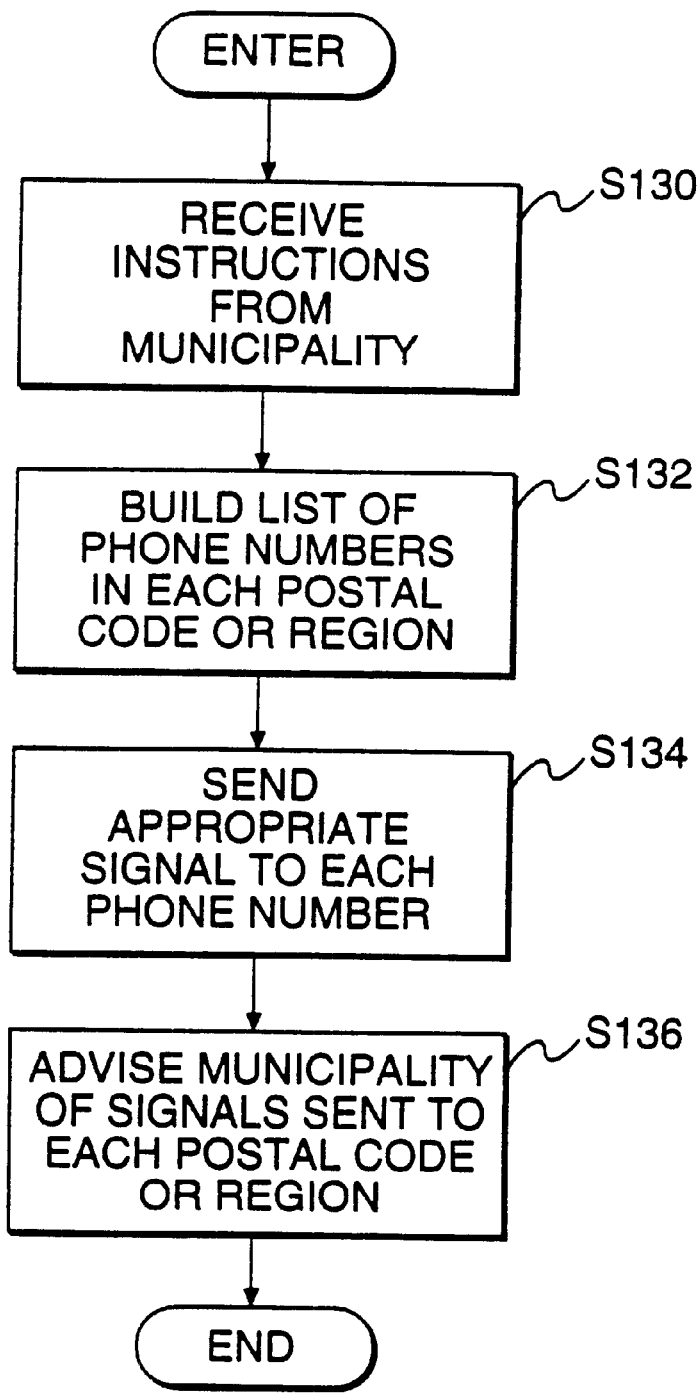

FIG. 13 is a flowchart of the telephone company routine of the emergency notification system of the present invention. The telephone company equipment constantly listens and monitors for instructions from the municipality A10 and is therefore ready to act quickly. Upon receipt of instructions from the municipality A10 (step S130), the system security codes are verified. The central office computer then preferably scans the telephone company client database, and identifies all telephone numbers registered to various geographic regional identifiers (postal/zip codes) matching those provided by the municipality, and builds a list of such telephone numbers for the identified regions (step S132). It then matches the signal type with the regional codes (postal/zip codes) and sends the signals to each telephone number identified, region by region in the sequence instructed by the municipality (step S134). As described above with respect to FIG. 5, in preferred embodiments the signal is an FSK signal. The signal is sent in accordance with Bellcore and Stentor industry standards for Visual Message Waiting Indication, On-Hook Transmission Not Associated with Ringing (aspects of these standards are described below). As an alternative, signals consistent with standards relating to Off-Hook Data Transmission, Analog Display Services Interface, and Data Transmission Associated with Ringing Transmission might also be used.

The time required to send the coded signal is less than one second per number, and more than one number may be reached at a time. With signals sent to all numbers of a specific region, then a notice of completion, by region, is sent to the system manager (step S136).

The present invention should achieve an order of 120,000 calls in an hour (compared to the 6,000 in prior systems). This estimate is based on a Bell Canada calculation using a DMS 20 switch (a very small switch). Using Bellcore's CLASS switches should achieve a 20 to 100 times improvement over prior systems.

As noted above, in preferred embodiments, the signal is sent in accordance with various telephone company (Bellcore and Stentor) and industry standards. These standards allow users to set and use messages in *Voiceband Data Transmission Interface* (GR-30-CORE, Issue 1, December 1994, Bellcore), the contents of which are hereby fully incorporated herein by reference. Some information about this interface is reproduced herein.

The Voiceband Data Transmission Interface supports two types of message formats, namely Single Data Message Format (SDMF) and Multiple Data Message Format (MDMF). Services can be delivered to subscribers in either format. Various values for message types are presently available within the Bellcore standard. In particular, the following values (binary) are presently available for use "0000 1011" and "1000 1000". This provides two available message types.

For potential global interoperability, the Frequency Shift Keying (FSK) modulation used to transmit the data may be based on either the Bell 202 or V.23 standard, as successful half-duplex ADSI or simplex MDMF data communications should be possible between equipment supporting either of these modulation standards.

If the receiving equipment does not recognize a parameter in the Custom Applications/message, it must ignore it.

A Multiple Data Message body contains one or more parameter messages. Each parameter message is identified by its header, which contains a parameter type value and the length of the parameter body to follow Parameter Types are only used in the MDMF. The following parameters are presently not in use and can be used by the system of this invention "0001 1101" to "0001 1111" (digital 29–31). These three values would provide at least the three levels of warning signal required. Combining them with the other, variable length parameters gives far more signals.

Note that standard states that the sum total of all parameters carried in the MDMF frame must not exceed 255 bytes.

It should be noted that in a preferred embodiment of the present invention, the telephone switch receives and transmits information to and from the system manager. There is a security provision to validate that the sender has the authority to issue such signals. Once validated and in the absence of telephone numbers being provided by the municipality as sometimes may happen, the telephone company performs a search of its customer database to identify all telephone numbers registered to addresses within the geographic territory identified by the system manager for notification. The postal/zip code can be expected to be the database search parameter. It is important to note that this database of numbers would be current and accurate to the day. Having identified the numbers to be contacted, the specific signal identified by the system provider to be transmitted is sent to all telephone numbers identified by the telephone company as being registered to addresses in the corresponding regions.

While the terms "alarm", "warning" and "emergency" are used herein to described particular applications of the present invention, other, non-alarm, non-warning and non-emergency notification uses of this invention are also considered to be a part of this invention. For example, this invention could be used by school systems to let parents and children know when school is to be closed for weather related reasons.

While the device is described herein as a stand-alone device, it could also be incorporated into other devices including a standard telephone, a telephone answering machine, a caller identifying device and the like.

While the device and system have been described with reference to analog telephone lines, the device could be modified to receive and process digital messages and signals.

It is envisioned that the present invention will operate with all forms of telephone carriers, including, but not limited to POTS, ISDN, coaxial cable systems, fiber optic cable systems and the like.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention involve all embodiments falling within the scope of the appended claims.

I claim:

1. A broadcast system for sending a message signal over at least one communication link to at least one of a plurality of potential receivers, the system comprising:

a transceiver system at a central location that receives a notification signal identifying a designated line of the at least one communication link and that transmits the message signal over the at least one communication link to the at least one of the plurality of potential receivers on the designated line;

an alarm device, associated with the at least one of the plurality of potential receivers that receives the message signal at a user location and that issues an alarm signal at the user location in response thereto, the alarm device comprising:

an alarm indicator;

means for demodulating a data signal received over the at least one communication link;

means for parsing a received data packet contained in the data signal to identify if the data packet is of an emergency alert type;

means for activating the alarm indicator at a user location according to a control word parameter contained in a modulated data signal, the modulated data signal comprising a unique data signal distinct from telephone supervisory signals and independent of call status; and means for providing at least one of a plurality of messages based on a parameter message contained in the modulated data signal.

* * * * *